W. V. TURNER.
DUPLEX BRAKE CYLINDER.
APPLICATION FILED FEB. 27, 1907.
902,185.
Patented Oct. 27, 1908.
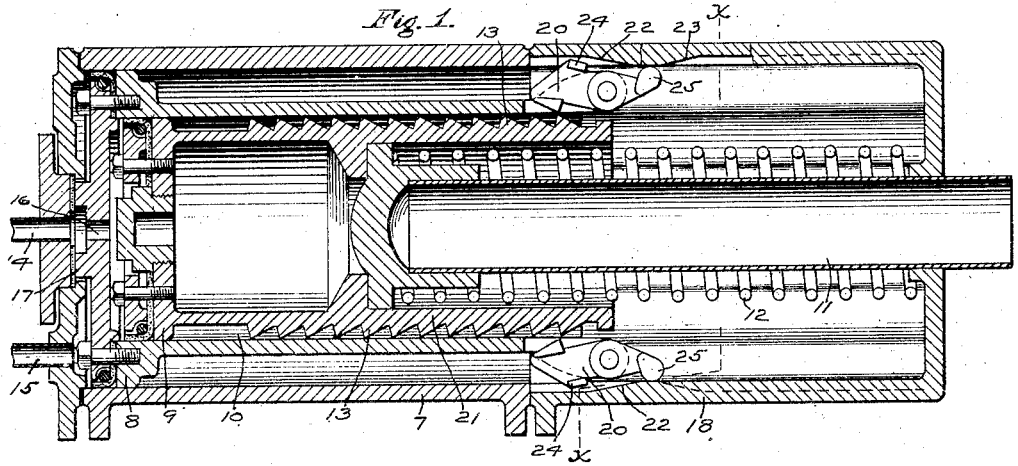
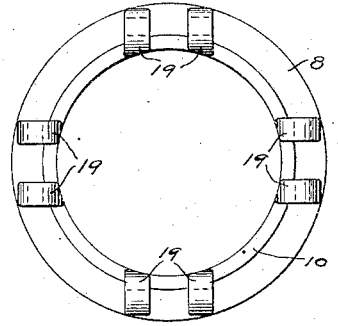
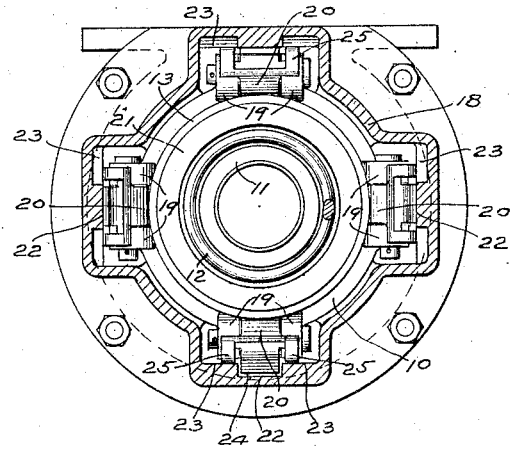
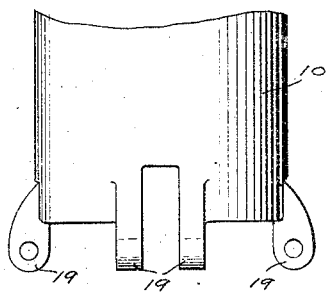
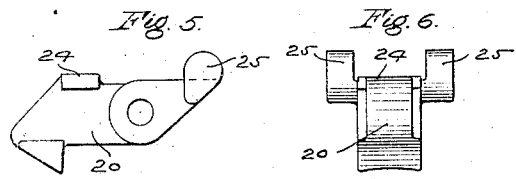
WITNESSES
INVENTOR
Walter V Turner
by E. Wright
Att'y.

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

DUPLEX BRAKE-CYLINDER.

No. 902,185.        Specification of Letters Patent.        Patented Oct. 27, 1908.

Application filed February 27, 1907. Serial No. 359,605.

*To all whom it may concern:*

Be it known that I, WALTER V. TURNER, a citizen of the United States, residing at Edgewood, in the county of Allegheny and State of Pennsylvania, have invented new and useful Improvements in Duplex Brake-Cylinders, of which the following is a specification.

This invention relates to brake cylinders adapted to be operated by fluid pressure, such as compressed air, and more particularly to a double brake cylinder apparatus, wherein one cylinder and piston, usually a small one, is employed for first taking up the slack in the brake rigging and applying the brake shoes to the wheels with light pressure, and then the fluid pressure is applied to a larger brake piston, which is locked to the small piston, or its connections, by a clutch device, for exerting the final heavy pressure upon the brake shoes.

The principal object of my present invention is to provide an improved locking means for attaching or clutching the large piston to the small piston, or its connections, after the latter has made an outward movement, whereby only a very short stroke of the large piston is necessary to apply the brakes with full power after the small piston has moved the brake shoes up against the wheels.

While my invention is especially adapted for use in connection with that form of double brake cylinder wherein the small cylinder and piston is mounted on the large piston, it is not necessarily limited thereto, but may also be applied in connection with other forms of duplex or double brake cylinder apparatus.

In the accompanying drawing; Figure 1 is a longitudinal section of a duplex brake cylinder apparatus of the type wherein the small cylinder and piston are mounted on the large piston, and illustrates one form of my invention which is applicable thereto; Fig. 2 a transverse section taken on the line x—x of Fig. 1; Fig. 3 an end view of the smaller cylinder, which is mounted on and forms a part of the large piston; Fig. 4 a plan view of the end of the same; and Figs. 5 and 6, side and end views respectively of one of the locking pawls which are carried by the large brake piston.

According to the construction shown in the drawing, the main or large brake cylinder 7 contains the large piston 8, on which is mounted the extension 10, forming a cylinder for the small brake piston 9, which operates the hollow piston rod 11 adapted to contain a push bar for connection to the brake rigging. The release spring 12 acts to return one or both pistons to the inner position when the fluid under pressure is exhausted from the brake cylinders.

The large piston head 8 is provided with a port 16 and a seat 17 surrounding the same for engaging a gasket on the head of the cylinder around the passage or port 14 for supplying and releasing fluid to and from the small cylinder on the face of piston 9. An additional port, or passage, 15 is employed for supplying fluid directly to the face of the large piston 8, in cylinder 7, and any suitable or preferred means may be used for controlling the supply of fluid to the port 15 and the large cylinder after the piston of the small cylinder has moved outward to take up the slack of the brake rigging.

In order to lock the large piston to the small piston, or its connections, when the large piston begins to move outward, and after the smaller piston has made its outward stroke, a pawl and ratchet mechanism may be provided, one part being operated by the movement of one piston and the other part being carried by the other piston. As shown in the drawing, such a structure may comprise one or more pawls, 20, pivotally mounted between lugs 19, on the cylinder extension 10 of the large piston 5, while the small piston is provided with a cylindrical extension 21 having ratchet teeth 13 formed thereon for engaging with said pawls.

Any suitable means may be employed for throwing the pawls into and out of engagement at the proper times, but I prefer to provide a guide which may be conveniently formed as casing 18, covering the end of the cylinder, and having guide surfaces 22 and 23 properly arranged to be engaged by the corresponding bearing portions 24 and 25 of the pawls 20, so that the pawls are forcibly thrown outward to engage the ratchet teeth when the large piston begins its outward movement, and are automatically released from such engagement when the piston is returned to its normal release position.

When air, or other fluid under pressure, is admitted through passage 14 and port 16 to the small cylinder, the piston 9 is moved quickly outward against the spring 12 and actuates the rod and brake rigging to take up the slack and bring the brake shoes against the wheels with the expenditure of only a small amount of fluid, necessary to fill the small cylinder; then when the fluid is admitted through port 15 to the large cylinder the large piston 8 starts upon its outward movement, carrying with it the pawl or pawls 20.

The guiding surfaces may be made in the form of grooves, with inclined planes, and as the part 24 of the pawl engages the inclined surface 22 the pawl is immediately thrown outward upon its pivot to engage the ratchet teeth 13, carried by the small piston, so that the clutch mechanism operates to lock the large piston to the smaller and apply full power of the fluid acting upon the area of the large piston to force the brake shoes against the wheels, but with the consumption of only a small volume of fluid, since the large piston travels but a short distance in its cylinder. In this manner, the maximum braking power is secured with a minimum volume of fluid, and a great saving is thereby effected in the amount of air or other fluid under pressure required to operate the brake system.

When the fluid is released from the brake cylinder, the spring 12 returns the pistions to their inner positions, and as the parts 25 of the pawls 20 engage their corresponding guide surfaces 23 the pawls are automatically released from engagement with the ratchet teeth.

It will now be seen that my improvement provides a simple, compact and durable construction for automatically locking the pistons together after the small piston has made its outward stroke and upon the initial movement of the large piston, thereby greatly economizing the amount of fluid necessary for braking purposes.

Having now described my invention, what I claim as new and desire to secure by Letters Patent, is:—

1. A duplex brake cylinder, comprising a large cylinder and piston, a small cylinder and piston mounted on the large piston, and means for locking the large piston to the smaller after the latter has moved outward in its cylinder each piston having means for supplying fluid under pressure thereto.

2. A duplex brake cylinder, comprising a large cylinder and piston, a small cylinder and piston mounted on the large piston, and a locking mechanism for connecting the large piston to the small piston each piston having means for supplying fluid under pressure thereto.

3. A duplex brake cylinder, comprising a large cylinder, a piston therein carrying a smaller cylinder, a piston in said small cylinder, and a clutch device for locking the large piston to the smaller after the latter has made an outward stroke each piston having means for supplying fluid under pressure thereto.

4. A duplex brake cylinder, comprising a large cylinder and piston, a small cylinder and piston mounted on the large piston, and a clutch device operating upon the initial movement of the large piston to lock the same to transmit movement to the small piston.

5. A duplex brake cylinder, comprising a large cylinder and piston, a small cylinder and piston mounted on the large piston, and locking means carried by the large piston for connecting the same to the small piston.

6. A duplex brake cylinder, comprising a large cylinder and piston, a small cylinder and piston mounted on the large piston, locking mechanism carried by the larger piston and normally held out of engagement, and means operating upon the initial movement of the large piston for forcing said locking mechanism into engagement.

7. A duplex brake cylinder, comprising a large cylinder and piston, a small cylinder and piston mounted on the large piston, locking pawls for clutching the large piston to the smaller, and means operating upon the outward movement of the large piston for throwing said pawls into action.

8. A duplex brake cylinder, comprising a large cylinder and piston, a small cylinder and piston, locking pawls for connecting said pistons together, and means operating upon the outward movement of the large piston to cause said pawls to engage, and upon the inward movement to cause said pawls to release.

9. A duplex brake cylinder, comprising a large cylinder and piston, a small cylinder and piston, locking pawls for connecting said pistons together, a fixed guide having surfaces for engaging said pawls and causing the same to engage upon the outward movement of the large piston and to release upon the inward movement.

10. A duplex brake cylinder, comprising a large cylinder and piston, and a small cylinder and piston, of locking means operated by the large piston for clutching said large piston to the smaller after the latter has made its outward stroke.

In testimony whereof I have hereunto set my hand.

WALTER V. TURNER.

Witnesses:
R. F. EMERY,
J. B. MACDONALD.